UNITED STATES PATENT OFFICE.

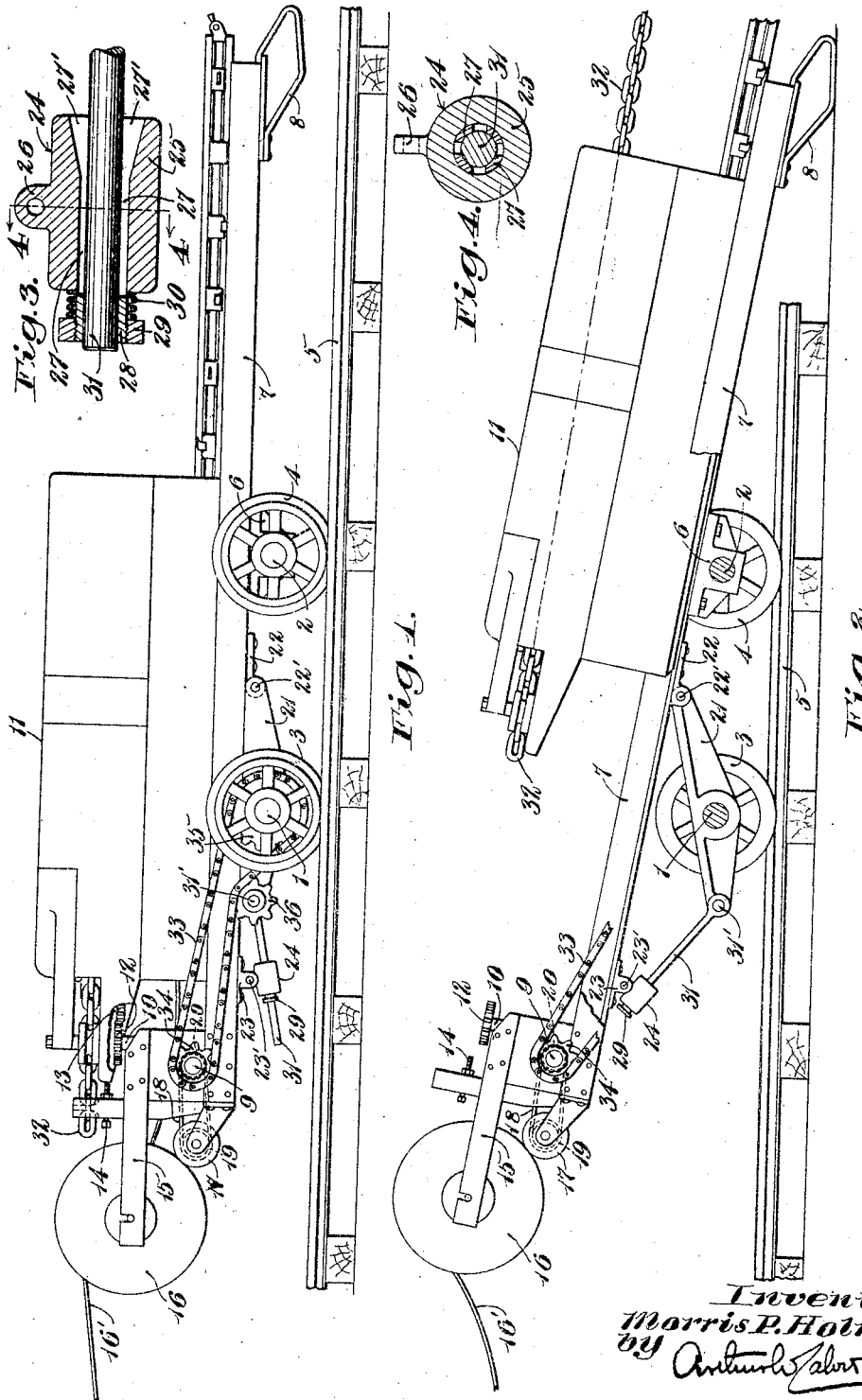
M. P. HOLMES.
TRUCK.
APPLICATION FILED DEC. 11, 1918.
1,378,811.
Patented May 17, 1921.
Inventor:
Morris P. Holmes.
by
Atty.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,811.     Specification of Letters Patent.     Patented May 17, 1921.

Application filed December 11, 1918. Serial No. 266,314.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide an automatic means for holding a solid frame mining machine truck in a tilted position, after the mining machine has been unloaded therefrom, so that the truck is in a position to receive the mining machine when it is desired to reload the machine onto the truck.

Heretofore it has been the practice to use a solid frame truck so constructed that when the front end of the truck is depressed by the weight of the mining machine, the rear end is elevated, with the result that when the machine slides off from the truck the rear end thereof falls suddenly, breaking the rear wheels or the cable reel supports, or derailing the truck. A few jack-knife trucks have been used in which the frame is in sections pivotally connected in such a manner that both ends of the truck are depressed during the unloading operation and, after the mining machine has been unloaded, the truck ends and wheels contact with the track or mine floor. This last construction is open to objection in that the pivoted frame members do not make as rigid and substantial a truck as the solid frame, and in that the rear end in some constructions strikes the track and loosens the reel supports.

These defects I have overcome by my present invention, which will be best understood by reference to the accompanying drawings, in which I have shown for purposes of illustration one embodiment which my invention may assume in practice.

In these drawings,—

Figure 1 is a side elevation of my improved truck with the mining machine thereon in loaded position.

Fig. 2 is a side elevation, partly broken away, of the truck with the mining machine in unloading or loading position.

Fig. 3 is a longitudinal sectional view of the clutch.

Fig. 4 is a transverse sectional view on the line 4—4 of Fig. 3.

Referring to the drawings, I have there shown for the purpose of illustrating the principal features of the invention a four-wheel truck having a plurality of axle members 1 and 2 carrying wheels 3 and 4 adapted to run on rails 5.

The front axle 2 is journaled in an axle box 6, which is preferably securely attached, as by bolts, to a rigid frame 7 in such a manner that this frame may be swung on the front axle as a pivot. As shown, this frame extends in front and rear of the two axles and is provided at its front end with a loading shoe 8, the latter being preferably formed of a forwardly extending, reversed frame member which limits the swinging movement of the frame and functions as a loading skid to facilitate the loading of the mining machine onto the truck frame. At its rear end the frame is provided in a well known manner with a transverse truck driving shaft 9 and a substantially vertically disposed shaft 10, the latter being driven by the mining machine 11 through suitable spur gears 12, 13 and in turn driving the shaft 9 through a worm and worm gear, not shown. Suitable means, such as a set screw 14, is provided for limiting the movement of the mining machine onto the truck so as to prevent injury to the spur gears 12, 13 and to hold these gears in their proper spaced relation.

There is also mounted on the rear of the mining machine frame, by means of the members 15, a cable reel or drum 16, for carrying and paying out an electric cable 16', it being understood that where the mining machine is operated by compressed air a hose drum may be substituted for the cable drum. As is usual in mining machine trucks of this type, a driving connection is provided between some positively driven member, as the shaft 9, and a friction wheel 17, engaging the drum head to rotate the drum to reel in the cable or hose when the truck is being run rearwardly. In the embodiment herein shown, this connection consists of a chain 18 passing over sprocket wheels 19 and 20 operatively attached to the friction wheel 17 and shaft 9, respectively.

In my improved construction, the rear axle 1 is mounted on a coöperating frame member or frame supporting member adapted to coöperate with the wheels 4 in supporting the frame 7 and shown herein in the form of an axle box 21 hingedly secured at its front end by a simple hinge 22 to the truck frame. On the truck frame, but to the rear of the rear wheel, I also mount, by means of a simple hinge somewhat similar to the hinge 22, a friction clutch 24 in the form of a sleeve 25 having an ear 26 which is connected with a hinge plate 23 by a hinge bolt 23'. This sleeve is preferably centrally bored throughout its length, the greater part of the bore being substantially cylindrical, and the rest of the bore being conical, with the base of the cone opening outward. Mounted in this sleeve 25 is a set of clutch jaws 27, preferably formed by splitting or sawing a hollow member for a part of its length to permit the jaws to be flexed, the unsplit part 28 of this inner sleeve serving to retain the jaws in their proper relative positions. The free ends 27' of these jaws 27 have inclined surfaces (as shown) to correspond to the coned surface of the sleeve 24, it being obvious that when the jaws move to the left these inclined surfaces on the sleeve and jaws will engage and force the jaws inward. To normally retain the inner sleeve in clutching position, and to prevent the disengagement of the clutch under a light load, I have provided a collar 29 which is preferably threaded onto the sleeve end 28 to form an abutment for one end of a coiled spring 30 which encircles the sleeve end 28 and abuts against one end of the sleeve 25, and serves also as a means for varying the tension of this spring.

Coöperating with this clutch and the rear axle box 21, I have provided a rod 31 pivotally connected to the rear end of the axle box by means of a bolt 31', and passing centrally through the clutch. As is clearly shown in Fig. 3, the clutch 25 does not tightly engage the rod when the axle box is moving downwardly, thus drawing the tie rod to the right, but when the axle box approaches the frame 7, thus moving the rod 31 to the left, the clutch jaws 27 are forced against the rod 31 and tend to grip the latter to prevent a further movement in that direction. The angle of the coned surfaces of the clutch and the tension of the spring 30 are so regulated that the clutch will prevent a movement of the rod to the left under the weight of the mining machine frame but will permit this movement under the weight of the frame and mining machine.

To strengthen the frame 7, the hinge bolts 22', 23' are preferably elongated so that they constitute cross frame members connecting the pairs of hinges oppositely disposed on the truck frame, it being understood that the construction herein shown as mounted on one side of the truck may be duplicated on the opposite side. If desired, in such a construction the hinge bolt 31' may constitute a spacing bar to hold the free ends of the axle boxes 14 properly spaced.

In the use of this improved construction, it will be readily understood that when the mining machine 11 is being unloaded from the truck by means of the feed chain 32, the weight of the machine will tilt the frame 7 on the front axle 2 as a fulcrum until the shoe 8 strikes the mine floor, when the machine may be run off. During this tilting of the solid frame, all the wheels remain on the track, the rear axle box swinging on its hinged connection with the frame and pulling the rod through the clutch. A return movement of the frame to a horizontal position is prevented by the action of the clutch until the mining machine is reloaded onto the truck, when the weight of the mining machine will force the clutch, as the center of gravity of the machine passes to the left of the front axle. The clutch jaws, however, do not release the rod but bear on it frictionally and tend to check the movement of the rear end of the frame downward so as to prevent breakage from a too rapid movement of the frame toward the rear axle box. This clutch serves the double purpose of holding the frame in a tilted position when the latter is in unloading position, and giving a dash pot reaction to the movement of the truck frame when the frame is being tilted from loading to loaded position.

The truck is propelled along the track by a chain 33, which passes over a driving sprocket 34 mounted on the shaft 9 and a driven sprocket 35 mounted on the axle 1. As is apparent from Figs. 1 and 2, the relative positions of these two sprockets 34, 35 is changed when the frame 7 is moved from the loaded to the unloading position, and vice versa. To compensate for this change in position, and to always retain the chain on the sprockets, there is provided an idler sprocket 36 mounted on the rear end of the rear axle box 21 and preferably, though not necessarily, mounted on the bolt 31'. The distance between centers of the sprockets 36 and 35 is so proportioned to the distance between centers of the sprockets 35 and 34 that the idler sprocket will take up the slack in the chain as the rear end of the frame moves downward without putting the chain under excessive tension.

The friction clutch may be set so that any weight applied to the rear end of the truck, when that end is elevated, will slip the clutch, but a large safety factor is preferably provided so that if a workman should sit on the truck or should place heavy tools thereon the truck will remain in a tilted position. The mining machines now in use weigh several thousand pounds, so that a large safety factor may be used, it being understood that the larger the safety factor the greater will be the dash pot action of the clutch.

While I have herein shown and described for the purpose of illustration one specific form of the invention, it is to be understood that the same has been chosen for illustrative purposes only and that extensive deviations may be made from the disclosed form thereof without departing from the spirit of the invention.

What I claim as new and desire to secure by Letters Patent is:

1. In a mining machine truck, a tiltable machine carrying frame pivotally mounted on a support and tiltable by a machine moving thereover, and friction means for retaining said frame in tilted position.

2. In a mining machine truck, a tiltable machine carrying frame pivotally mounted on a support and tiltable by a machine moving thereover, and automatically acting friction means for retaining said frame in tilted position.

3. In a mining machine truck, a tiltable machine loading and unloading frame pivotally supported, and friction means for supporting said frame in its tilted position when the same is disposed at any one of a plurality of angles.

4. In a mining machine truck, a tiltable machine loading and unloading frame pivotally supported, and automatically acting friction means for supporting said frame in its tilted position when the same is disposed at any one of a plurality of angles.

5. In a mining machine truck, a tiltable machine carrying frame pivotally mounted on a support and tiltable into contact with the bottom by a machine moving thereover, and clutch means for retaining said frame in tilted position.

6. In a mining machine truck, a tiltable machine carrying frame pivotally mounted on a support and tiltable by a machine moving thereover, and automatically acting clutch means for retaining said frame in tilted position.

7. In a mining machine truck, a tiltable machine loading and unloading frame pivotally supported, and clutch means for supporting said frame in its tilted position when the same is disposed at any one of a plurality of angles.

8. In a mining machine truck, a tiltable machine loading and unloading frame pivotally supported, and automatically acting clutch means for supporting said frame in its tilted position when the same is disposed at any one of a plurality of angles.

9. In a mining machine truck, a tiltable machine carrying frame pivotally supported between the ends thereof, and friction means for supporting said frame controlled by a weight on the latter and disposed in the rear of the pivot thereof.

10. In a mining machine truck, a tiltable machine carrying frame pivotally supported between the ends thereof, and clutch means for supporting said frame controlled by a weight on the latter and disposed in the rear of the pivot thereof.

11. In a mining machine truck, a machine carrying frame pivotally supported, and frictionally engaging supporting means therefor disposed in the rear of the pivot thereof and automatically controlled by the position of a machine movable thereover.

12. In a mining machine truck, a machine carrying frame pivotally supported, and clutch engaging supporting means therefor disposed in the rear of the pivot thereof and automatically controlled by the weight of a machine movable thereover.

13. In a mining machine truck, a wheeled member, a machine carrying frame pivotally supported on said member and tiltable by a machine movable thereover, and friction means for retaining said frame in tilted position controlled by the weight of said machine.

14. In a mining machine truck, a wheeled member, a machine carrying frame pivotally supported on said member and tiltable by a machine movable thereover, and friction means for retaining said frame in tilted position, said means being releasable by the weight of said machine.

15. In a mining machine truck, a wheeled member, a machine carrying frame pivotally supported on said member and tiltable by a machine movable thereover, and clutch means for retaining said frame in tilted position controlled by the position of said machine.

16. In a mining machine truck, a wheeled member, a machine carrying frame pivotally supported on said member and tiltable by a machine movable thereover, and clutch means for retaining said frame in tilted position, said means being adapted to be forced upon a predetermined movement of said machine.

17. In a mining machine truck having front and rear axles, a machine carrying frame pivoted on said front axle and extending in the rear of said rear axle, said frame being tiltable about said front axle to and from unloading position by a machine movable thereover, and automatic clutch engaging means for supporting said frame in tilted position.

18. In a mining machine truck having front and rear axles, a machine carrying frame pivoted on said front axle and extending in the rear of said rear axle, said frame being tiltable about said front axle to and from unloading position by a machine movable thereover, a member engaging said rear axle, and coöperating means on said frame and member for retaining said body in tilted position.

19. In a mining machine truck having front and rear axles, a machine carrying frame pivoted on said front axle and extending in the rear of said rear axle, said frame being tiltable about said front axle to and from unloading position by a machine movable thereover, a member engaging said rear axle, and coöperating frictionally engaging means on said frame and member for retaining said body in tilted position.

20. In a mining machine truck having front and rear axles, a machine carrying frame pivoted on said front axle and extending in the rear of said rear axle, said frame being tiltable about said front axle to and from unloading position by a machine movable thereover, a clutch mounted on said frame, and a rod mounted adjacent said rear axle and adapted to engage said clutch to retain said frame in a tilted position.

21. In a mining machine truck having a tiltable machine carrying frame, a front axle mounted on said frame and serving as a pivot about which said frame is tilted, a rear axle member having an axle box hingedly connected to said frame, and coöperating means mounted on said frame and box for supporting the frame in a tilted position.

22. In a mining machine truck having a tiltable machine carrying frame, a front axle mounted on said frame and serving as a pivot about which said frame is tilted, a rear axle member having an axle box hingedly connected to said frame, a clutch mounted on said frame, and a rod mounted on said box and coöperating with said clutch for retaining said frame at any one of a plurality of angles.

23. In a mining machine truck having a tiltable machine carrying frame, a front axle mounted on said frame and serving as a pivot about which said frame is tilted, a rear axle member having an axle box hingedly connected to said frame, a clutch mounted on said frame, and a tie rod mounted on said box and coöperating with said clutch for retaining said frame at any one of a plurality of angles, said clutch being operative to support the frame in a tilted position but inoperative to support the frame and mining machine in said position.

24. In a mining machine truck having a tiltable machine carrying frame, a front axle mounted on said frame and serving as a pivot about which said frame is tilted, a rear axle member having an axle box hingedly connected to said frame, a clutch mounted on said frame, and a coöperating rod mounted on said box for retaining said frame at any one of a plurality of angles, said clutch being operative to support the frame in a tilted position and to resist the movement of the frame to a horizontal position as the mining machine is loaded thereon.

25. In a mining machine truck having a tiltable machine carrying frame pivotally supported, an axle box hingedly secured to the frame, an axle supported thereby, a driven element mounted on said axle, a driving element mounted on said frame, a flexible driving connection between said elements, and a loose wheel mounted on said axle box and adapted to take up and let out the slack in said connection as the frame is tilted on its pivot.

26. In a mining machine truck having a tiltable machine carrying frame pivotally supported, an axle box hingedly secured to the frame, coöperating means on said box and frame for retaining said frame in a tilted position, an axle supported thereby, a driven element mounted on said axle, a driving element mounted on said frame, a flexible driving connection between said elements, and a loose wheel mounted on said axle box and adapted to take up and let out the slack in said connection as the frame is tilted on its pivot.

27. In a mining machine truck having a tiltable machine carrying frame pivotally supported at one end, an axle box hingedly secured to the frame, an axle supported thereby, a driven element mounted on said axle, a driving element mounted on said frame, a flexible driving connection between said elements, and a loose wheel movably mounted on said frame and adapted to take up and let out the slack in said connection as the frame is tilted on its pivot.

28. In a mining machine truck having a tiltable machine carrying frame pivotally supported at one end, an axle box hingedly secured to the frame, coöperating means on said box and frame for retaining said frame in a tilted position when the mining machine is unloaded and for retarding the movement of the frame from tilted position as the mining machine is loaded thereon, an axle supported by said axle box, a driven element mounted on said axle, a driving element mounted on said frame, a flexible driving connection between said elements, and a loose wheel mounted on said axle box and adapted to take up and let out the slack in said connection as the frame is tilted on its pivot.

29. In a mining machine truck, a wheel, a member supported thereby, a tiltable machine carrying frame pivoted on said member and tiltable by a mining machine moving thereover, a wheel supporting element engaging said frame, a driving connection between said mining machine and said wheel, and friction means for retaining said frame in a tilted position.

30. In a mining machine truck, a wheel, a member supported thereby, a tiltable machine carrying frame pivoted on said member and tiltable by a machine moving thereover, a wheel supporting element hingedly connected to said frame, a driving connection between said mining machine and said wheel, and friction means for retaining said frame in a tilted position.

31. In a machine carrying truck, a mining machine frame, tiltable to a loaded or unloaded position, a wheeled supporting element hingedly connected to said frame and contacting with the frame when the latter is in loaded position, and means carried by the frame and element for partially supporting said frame when the latter is in unloading position.

32. In a mining machine truck, front and rear wheels, a machine receiving frame tiltable about the axis of said front wheels, a coöperating frame member pivotally connected to said frame in rear of said axis and tiltable about the axis of the rear wheels, and an operative connection between said coöperating frame member and said frame.

33. In a mining machine truck, front and rear wheels, a machine receiving frame tiltable about the axis of said front wheels, a coöperating frame member pivotally connected thereto in rear of said pivot and tiltable in opposite directions about the axis of the rear wheels upon movement of said frame, and means for maintaining said frame members in tilted position comprising coöperating elements pivoted to each of them.

34. In a mining machine truck, front and rear wheels, a machine receiving frame tiltable about the axis of said front wheels, a coöperating frame member pivotally connected thereto in rear of said axis and tiltable about the axis of the rear wheels, and means between said coöperating member and said frame for supporting the latter in elevated position and retarding the lowering thereof.

35. In a mining machine truck, wheeled frame members pivotally connected at a point between their wheels, one of said frame members having a portion extending rearwardly beyond said pivot, and operative connections between the other member and said rearwardly extending portion for maintaining the latter in elevated position.

36. In a mining machine truck, wheeled frame members pivotally connected at a point between their wheels, one of said frame members having a portion extending rearwardly beyond said pivot, and means on the other member for supporting said rearwardly extending portion and set and released upon reverse tilting movements of said portion.

37. In a mining machine truck, a machine carrying frame pivotally supported and tiltable by a machine moving thereover, a wheeled supporting member hingedly secured to said frame, driving elements mounted on said frame and member respectively, a flexible connection therebetween, and means mounted on said member for taking up the slack in said flexible connection.

38. In a mining machine truck, a machine carrying frame pivotally supported and tiltable by a machine moving thereover to a machine receiving or a loaded position, a supporting member for said frame, and a clutch supporting means interposed between said frame and member.

39. In a mining machine truck, a machine carrying frame pivotally supported and tiltable by a machine moving thereover to a loading or a loaded position, a supporting member for said frame, and a clutch supporting means interposed between said frame and member, said clutch means being operative to retain the frame in a tilted position but inoperative to retain the frame and mining machine in said position.

40. In a mining machine truck, a machine carrying frame pivotally supported and tiltable by a machine moving thereover to a loading or a loaded position, a wheeled supporting member hinged to said frame, and a clutch supporting means interposed between said frame and member.

41. In a mining machine truck, a machine carrying frame pivotally supported and tiltable by a machine moving thereover to a loading or a loaded position, a wheeled supporting member hinged to said frame, and a clutch supporting means interposed between said frame and member, said clutch means being operative to retain the frame in a tilted position but inoperative to retain the frame and mining machine in said position.

42. In a mining machine truck, wheeled frame members pivotally connected at a point between their wheels, one of said members having a portion extending rearwardly beyond said pivot, a reel carried on said portion, and means between said other frame member and said rearwardly extending portion for maintaining the same in a tilted position.

43. In a mining machine truck, wheeled frame members pivotally connected at a point between their wheels, one of said members having a portion extending rearwardly beyond said pivot, truck driving mechanism upon said rearwardly extending portion, and means between said other frame member and said rearwardly extending portion for maintaining the same in a tilted position.

44. In a mining machine truck, wheeled frame members pivotally connected at a point between their wheels, one of said members having a portion extending rearwardly beyond said pivot, a reel carried upon said extending portion, truck driving mechanism carried upon said portion, and means between said other frame member and said rearwardly extending portion for maintaining the same in a tilted position.

45. In a mining machine truck, a plurality of wheeled frame members pivotally connected at a point between their wheels, one of said members forming a tiltable machine receiving member and extending rearwardly beyond said pivot, and means operatively connected to said members for supporting said machine receiving member in tilted position upon the discharge of a machine therefrom and releasing said member upon the return of a machine thereto.

46. In a mining machine truck, a plurality of wheeled frame members pivotally connected at a point between their wheels, one of said members forming a tiltable machine receiving member and extending rearwardly beyond said pivot, and means operatively connected to said members for supporting said machine receiving members in tilted position upon the discharge of a machine therefrom and resisting movement of said member upon the return of a machine thereto.

47. In a mining machine truck, a machine receiving member tiltable to unloading or loaded position by a machine movable thereover, supporting means for said member during transport, and means between said supporting means and member for supporting the latter in tilted unloading position and for retarding the reverse tilting movement thereof to loaded position as a machine is loaded thereon.

48. In a mining machine truck, a machine receiving member tiltable to unloading or loaded position by a machine movable thereover, a wheel carrying axle box pivotally connected to said member in rear of its pivot, said axle box coöperating with said member to support the same during transport and upon unloading movement of said member being disposed thereby at an angle to said member.

49. In a mining machine truck, a machine receiving member tiltable to unloading or loaded position by a machine movable thereover, a wheel carrying axle box pivotally connected to said member in rear of its pivot, said axle box coöperating with said member to support the same during transport and upon unloading movement of said member, being disposed thereby at an angle to said member and means for retaining said member in unloading position.

50. In a mining machine truck, a machine receiving member tiltable to unloading or loaded position by a machine movable thereover, a wheel carrying axle box pivotally connected to said member in rear of its pivot, said axle box coöperating with said member to support the same during transport and upon unloading movement of said member being disposed thereby at an angle to said member, and operative connections between said axle box and said member for retaining the latter in unloading position.

51. In a mining machine truck, a machine receiving unit having a wheeled axle thereunder about which said unit is adapted to pivot in tilting in a vertical plane, a wheeled unit disposed in rear of said axle, pivotal connections between the rearward end of said machine receiving unit and the front end of said other unit, and a shaft adapted to be driven by a mining machine supported on said truck on one of said units and operatively connected to the wheels of the other unit only.

52. In a mining machine truck, a machine receiving unit having a wheeled axle thereunder about which said unit is adapted to pivot in tilting in a vertical plane, a wheeled unit disposed in rear of said axle, operative connections between said units whereby said first mentioned unit may be supported in tilted position by said second mentioned unit, and a mining machine driven shaft on one of said units having a direct driving connection with the wheels of said other unit.

53. In a mining machine truck, a machine receiving frame having a wheeled axle thereunder about which said frame is adapted to pivot, a coöperating frame member pivotally connected thereto in rear of said pivot and tiltable in an opposite direction upon movement of said frame, and means pivoted to each of said frame members and coöperating to maintain the same in tilted position.

54. In a mining machine truck, front and rear wheels, a machine receiving frame tiltable about the axis of said front wheels, a coöperating frame member pivotally connected thereto in rear of said pivot and tiltable in an opposite direction about the axis of the rear wheels upon movement of said frame, and means having pivotal connections with said machine receiving frame and coöperating frame member and operative to automatically maintain them in angular relation upon tilting of said machine receiving frame, but yieldable upon movement of a machine upon said frame.

55. In a mining machine truck, a tiltable machine carrying frame element, a wheeled frame supporting truck element with respect to which said frame element makes an angle when in tilted position, a shaft adapted to be driven by a mining machine on one of said elements, a flexible driving connection between said shaft and said other element, and means for preventing slack in said driving connection.

56. In a mining machine truck, a tiltable machine carrying frame element comprising a wheeled axle about which said element is adapted to tilt, a wheeled frame supporting truck element with respect to which said frame element makes an angle when in tilted position, a mining machine driven shaft on one of said elements, a driving connection between said shaft and a wheel of said other element, and means on one of said elements for preventing slack in said driving connection.

In testimony whereof I affix my signature.

MORRIS P. HOLMES.